(12) United States Patent
Guironnet et al.

(10) Patent No.: US 10,947,330 B2
(45) Date of Patent: Mar. 16, 2021

(54) ENCAPSULATED CATALYST AND METHODS OF OLEFIN POLYMERIZATION

(71) Applicants: ROHM AND HAAS COMPANY, Collegeville, PA (US); The Board of Trustees of the University of Illinois, Urbana, IL (US)

(72) Inventors: Damien Guironnet, Urbana, IL (US); Muhammad Rabnawaz, East Lansing, MI (US); Ralph Even, Blue Bell, PA (US); Andrew Hughes, Greensboro, NC (US); Joshua Katz, Merion Station, PA (US)

(73) Assignees: ROHM AND HAAS COMPANY, Collegeville, PA (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/638,951

(22) PCT Filed: Aug. 20, 2018

(86) PCT No.: PCT/US2018/047083
§ 371 (c)(1),
(2) Date: Feb. 13, 2020

(87) PCT Pub. No.: WO2019/036718
PCT Pub. Date: Feb. 21, 2019

(65) Prior Publication Data
US 2020/0223957 A1 Jul. 16, 2020

Related U.S. Application Data

(60) Provisional application No. 62/547,406, filed on Aug. 18, 2017.

(51) Int. Cl.
| | | |
|---|---|---|
| *B01J 31/06* | (2006.01) | |
| *B01J 31/28* | (2006.01) | |
| *C08F 4/80* | (2006.01) | |
| *C08F 10/02* | (2006.01) | |
| *C08F 4/70* | (2006.01) | |
| *B01J 31/16* | (2006.01) | |

(52) U.S. Cl.
CPC .............. *C08F 10/02* (2013.01); *B01J 31/06* (2013.01); *B01J 31/063* (2013.01); *B01J 31/165* (2013.01); *B01J 31/28* (2013.01); *C08F 4/7022* (2013.01); *C08F 4/7031* (2013.01); *C08F 4/80* (2013.01)

(58) Field of Classification Search
CPC . B01J 31/06; B01J 31/063; B01J 31/16; B01J 31/28; C08F 4/80
See application file for complete search history.

(56) References Cited

U.S. PATENT DOCUMENTS

| | | | | |
|---|---|---|---|---|
| 6,060,569 | A | 5/2000 | Bennett et al. | |
| 6,958,255 | B2 * | 10/2005 | Khuri-Yakub | B06B 1/0688 |
| | | | | 438/118 |
| 7,030,255 | B2 * | 4/2006 | Grey | B01J 13/08 |
| | | | | 502/64 |
| 7,276,464 | B2 * | 10/2007 | Le-Khac | B01J 13/06 |
| | | | | 502/159 |
| 8,110,519 | B2 * | 2/2012 | Kobayashi | C08F 212/14 |
| | | | | 502/159 |
| 8,318,967 | B2 * | 11/2012 | Kobayashi | C07F 15/0086 |
| | | | | 556/430 |
| 8,563,753 | B2 * | 10/2013 | Screen | B01J 13/16 |
| | | | | 549/373 |
| 8,765,627 | B2 * | 7/2014 | Cramail | B01J 31/143 |
| | | | | 502/159 |
| 8,785,665 | B2 | 7/2014 | Berl | |
| 8,828,902 | B2 * | 9/2014 | Ramarao | B01J 31/04 |
| | | | | 502/159 |
| 9,399,211 | B2 * | 7/2016 | Pears | B01J 37/0219 |
| 2005/0201925 | A1 * | 9/2005 | Le-Khac | C01B 15/029 |
| | | | | 423/584 |
| 2006/0167147 | A1 * | 7/2006 | Asgari | A61K 33/24 |
| | | | | 524/174 |
| 2007/0173602 | A1 * | 7/2007 | Brinkman | C08F 222/1006 |
| | | | | 524/592 |
| 2016/0145464 | A1 * | 5/2016 | Gibbs | C09D 167/08 |
| | | | | 523/205 |
| 2016/0304678 | A1 * | 10/2016 | Moravek | C08F 4/10 |

FOREIGN PATENT DOCUMENTS

| | | |
|---|---|---|
| EP | 1693105 A1 | 8/2006 |
| WO | 2004087772 A1 | 10/2004 |

OTHER PUBLICATIONS

Boucher-Jacobs, C.; Rabnawaz, M.; Katz, J.S.; Even, R.; Guironnet, D. Nature Communications 9, 841 (2018). (Year: 2018).*
Terashima, T.; Kamigaito, M.; Baek, K.-Y.; Ando, T.; Sawamoto, M. J.Am.Chem.Soc. 2003, 125, 5288-5289. (Year: 2003).*
Bauers FM et al; "High Molecular Mass Polyethylene Aqueous Latexes by Catalytic Polymerization"; Angewandte Chemie, International Edition, Wley-VCH, DE, vol. 40, Issue No. 16; Aug. 15, 2001; pp. 3020-3022.
Boucher-Jacobs et al; "Encapsulation of catalyst in block copolymer micelles for the polymerization of ethylene in aqueous medium"; Nature Communications, Vo. 19, No. 1; Feb. 26, 2018; pp. 1-9.
Godin et al., "Aqueous Dispersions of Multiphase Polyolefin Particles", Macromolecules, vol. 49, 2016; pp. 8296-8305.

(Continued)

*Primary Examiner* — Rip A Lee
(74) *Attorney, Agent, or Firm* — Cantor Colburn LLP

(57) ABSTRACT

A method for encapsulating a catalyst in a dispersed polymer particle comprising dissolving a Group 8 to Group 11 transition metal containing catalyst and a self-dispersing polymer in a solvent; adding water and optionally a base under particle forming conditions to form a dispersed polymer encapsulated catalyst comprising particles having a population number average diameter between 10 and 300 nanometers is provided.

14 Claims, 1 Drawing Sheet

(56) References Cited

OTHER PUBLICATIONS

Godin et al., "Nanocrystal Formation in Aqueous Insertion Polymerization", Macromolecules, vol. 49, 2016; pp. 8825-8837.
Gottker-Schnetmann, "Water-Soluble Salicylaldimanto Ni(II)-Methly Complexes: Enhanced Dissociative Activation for Ethylene Polymerization with Unprecedented Nanoparticle Formation," JACS Communications, vol. 128 No. 24, 2006; pp. 7708-7709.
International Preliminary Report on Patentabilty for International Application No. PCT/US2018/047083; International Filing Date: Aug. 20, 2018; dated Dec. 16, 2019; 13 pages.
International Search Report and Written Opionion for International Application No. PCT/US2019/053080; International Filing Date: Sep. 26, 2019; dated Jan. 24, 2020; 14 pages.
International Search Report for international Application PCT/US2018/047083, International Date of Filing Aug. 20, 2018, dated Jan. 2, 2019, 6 pages.
Korthals et al., "Nickel(II)-Methyl Complexes with Water-Soluble Ligands L [(salicylaldiminato-K2N,O)NiMe(L)] and Their Catalytic Properties in Disperse Aqueous Systems", Organometallics, vol. 26, 2007; pp. 1311-1316.
Sauca et al., "Catalytic polymerization of ethylene in aqueous media", Chemical Engineering Journal, vol. 168, 2011; pp. 1319-1330.
Van Oers et al; "Aqueous asymmetric cyclopropanation reactions in polymersome membranes"; Chemical Commnications, vol. 50, Issue No. 31; Jan. 13, 2014; pp. 4040-4043.
Written Opinion for International Application No. PCT/US2018/047083; International Filing Date: Aug. 20, 2018; dated Jul. 29, 2019; 9 pages.
Written Opinion for International Application PCT/US2018/047083, International Date of Filing Aug. 20, 2018, dated Jan. 2, 2019, 10 pages.
Yu et al., "Synthesis of Aqueous Polyethylene Dispersions with Electron-Deficient Neutral Nickel(II) Catalysts with Enolatoimine Ligands", Macromolecules, vol. 40, 2007; pp. 421-428.
Yu et al., "Variable Crystallinity Polyethylene Nanoparticles", Macromolecules, vol. 42, 2009; pp. 3669-3673.
Zhang et al., "Water-Soluble Complexes [(K2-P, O-Phosphinesulfonato)PdMe(L)] and Their Catalytic Properties", Organometallics, vol. 28, 2009; pp. 4072-4078.
Zhang et al; "Core-Shell Nanoreactors for Efficient Aqueous Biphasic Catalysis"; Chemistry—A European Journal, vol. 20, Issue No. 47; Oct. 3, 2014; pp. 15505-15517.

\* cited by examiner

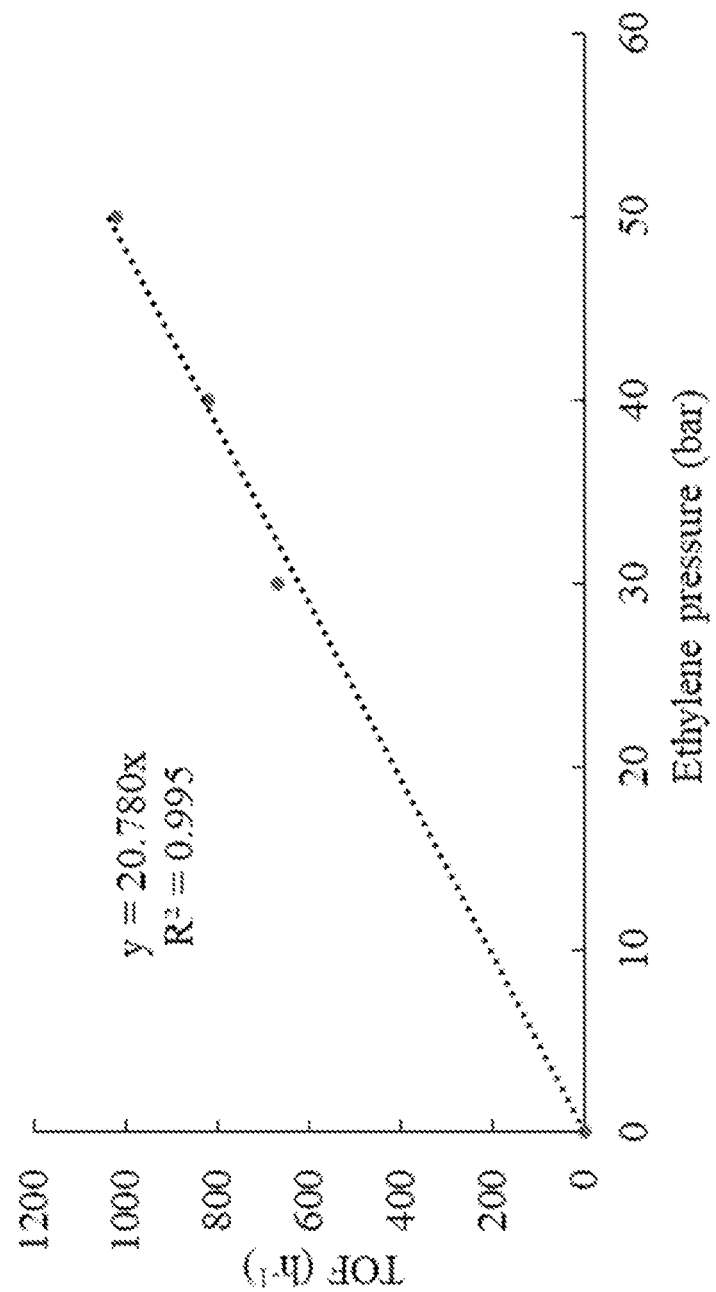

ENCAPSULATED CATALYST AND METHODS OF OLEFIN POLYMERIZATION

CROSS REFERENCE TO RELATED APPLICATIONS

This application is a National Stage application of PCT/US2018/047083, filed Feb. 21, 2018, which claims the benefit of U.S. Provisional Application No. 62/547,406, filed Aug. 18, 2017, both of which are incorporated by reference in their entirety herein.

BACKGROUND

Catalytic polymerization of olefins and emulsion polymerization processes are used in the production of polymers. The early transition metal catalysts typically used for olefin polymerization are extremely water soluble or water sensitive, meaning the catalyst is unstable in the presence of water, and these catalysts are therefore unsuitable for emulsion polymerization processes.

A catalyst that can be used for catalytic polymerization of olefins such as ethylene in an emulsion is needed.

SUMMARY

A method for encapsulating a catalyst in a dispersed polymer particle comprising dissolving a Group 8 to Group 11 transition metal containing catalyst and a self-dispersing polymer in a solvent; adding water and optionally a base under particle forming conditions to form a dispersed polymer encapsulated catalyst comprising particles having a population number average diameter between 10 and 300 nanometers is provided.

A method of catalytic olefin polymerization, comprising contacting a dispersed polymer encapsulated catalyst with one or more monoethylenically unsaturated monomers under polymerization conditions to form a polyolefin is provided.

A dispersed polymer encapsulated catalyst comprising a group 8 to 11 transition metal containing catalyst and a self-dispersing block copolymer dispersed in a solvent is provided.

A latex made by the method of reacting a dispersed polymer encapsulated catalyst with a monoethylenically unsaturated monomer under polymerization conditions to form a latex having a number average molecular weight of 1,500 to 200,000 Daltons; 10,000 to 100,000 Daltons; 20,000 to 50,000 Daltons; or 1,500 to 10,000 Daltons, wherein the catalyst is a group 8 to 11 transition metal containing catalyst and the polymer is a self-dispersing block copolymer and the polymerization conditions are application of pressure and agitating is provided.

BRIEF DESCRIPTION OF THE FIGURES

The FIGURE shows a plot of turnover frequency (TOF) at various pressures (micelles formed with: 16 micro-molar (μmol) $L_1Pd$—$NR_3$, 430 milligrams (mg) $PEG_{(114)}$-b-$PCF_{3(27)}$, at 85° C., 1 hour (h)).

DETAILED DESCRIPTION

The inventors hereof have unexpectedly discovered encapsulated catalysts that can be used in emulsion polymerization methods to make polyolefins. The catalysts are encapsulated within a polymer dispersed in water. The polymer is an amphiphilic polymer that forms a polymer micelle or polymer particle with a hydrophobic core in water.

The catalysts are late transition metal containing catalysts. Late transition metals are Group 8 to Group 11 transition metals, including Fe, Co, Ni, Cu, Ru, Rh, Pd, Ag, Os, Ir, Pt, and Au. The Group 8 to Group 11 transition metal containing catalysts include complexes of the transition metals and ligands such as phosphinosulfonate and nitrogen-containing compounds. In an embodiment, the ligands comprise aromatic rings and one or more halogens. In an embodiment, a ligand is a nitrogen-containing compound. In an embodiment, a ligand is pyridine. In an embodiment, a ligand is —$NR_3$, where each R is the same or different and is a straight-chain or branched alkyl group having 1-10 carbon atoms. In an embodiment, —$NR_3$ is —$N(CH_3)_2(C_5H_{11})$. In an embodiment, a ligand is a base. In an embodiment, a ligand is a Lewis base. In an embodiment, a ligand is an amine, pyridine, or phosphine. In an embodiment, a ligand is a ketone, ether, phosphine oxide, sulfoxide, alcohol, or olefin.

The Group 8 to Group 11 transition metal containing catalyst can be any Group 8 to Group 11 transition metal containing catalyst that can undergo ethylene polymerization without the need of an activator.

Examples of the Group 8 to Group 11 transition metal containing catalysts include:

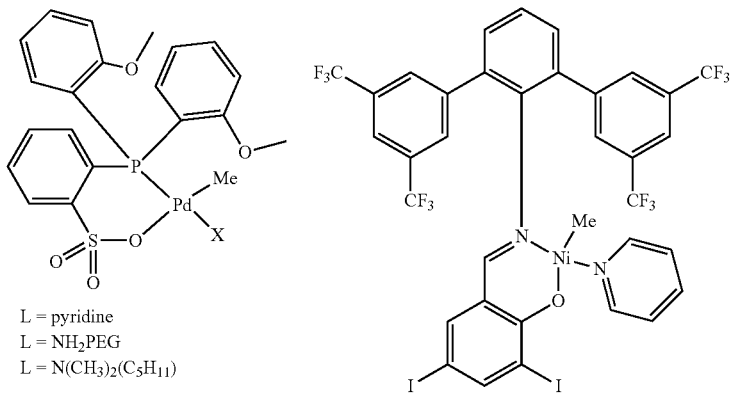

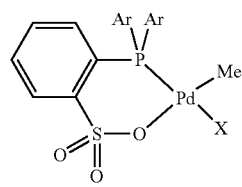 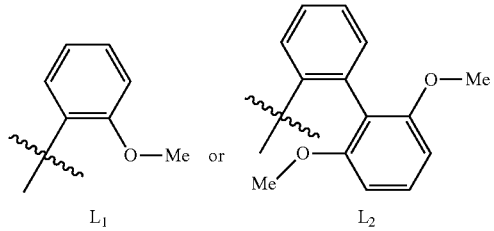

X = DMSO, N(Me)$_2$C$_6$H$_{13}$ (NR$_3$), NH$_2$PEG$_{52}$

The polymer has an amphiphilic structure and comprises sub-portions that are hydrophilic or water-soluble and other sub-portions that are hydrophobic or water-insoluble. The polymer is soluble in a solvent in which the Group 8 to Group 11 transition metal containing catalyst is also soluble. The solvent can be tetrahydrofuran (THF), dimethylformamide (DMF), dimethyl sulfoxide (DMSO), methanol, any solvent that is more water soluble than THF, or a combination comprising at least one of the foregoing. In an exemplary embodiment the polymer is self-dispersing (referred to herein as "self-dispersing polymer"). Self-dispersing means that the polymer is capable of forming stable particles in water in the absence of surfactants or colloidal stabilizers. The particle size of stable polymer particles as measured by light scattering techniques described herein will change by no more than 25% when allowed to stand at 25° C. for 24 hours.

The polymer can be a block copolymer. The water-insoluble block can comprise repeat units of esters of (meth)acrylic acid, styrene, butadiene, ethyl ethylene (the polymer formed by the polymerization of 1-butene or preparing poly(1,2-butadiene) and then hydrogenating the remaining unsaturation), lactide, caprolactone, trimethylene carbonate, glycolide, dimethylsiloxane, cyclooctene, ethylene, propylene, norbornene, propylene oxide, butylene oxide, or a combination comprising at least one of the foregoing. The water-soluble block can comprise repeat units of ethylene glycol, ethylene oxide, methacrylic acid, acrylic acid, acrylamide, styrene sulfonate, polyethylene glycol esters of (meth)acrylic acid, or a combination comprising at least one of the foregoing.

The self-dispersing polymer can be a comb/graft polymer. A comb-graft polymer has a relatively long polymeric backbone bearing multiple, usually shorter, pendant polymeric chains, where the pendant chains have a composition different from that of the backbone chain. One of the backbone chain or pendant chain compositions is hydrophobic or water insoluble and the other is hydrophilic or water soluble. In an embodiment, hydrophobic chain segments comprise repeat units of esters of (meth)acrylic acid, styrene, or butadiene. In an embodiment, hydrophilic chain segments comprise repeat units of (meth)acrylic acid, (meth) acrylamides, hydroxyl functional esters of (meth)acrylic acid, or polyethylene glycol esters of (meth)acrylic acid.

In an embodiment, the self-dispersing polymer is a random copolymer of hydrophobic and hydrophilic monomer repeat units. Hydrophobic monomers include esters of (meth)acrylic acid, styrene, and butadiene. Hydrophilic monomers include (meth)acrylic acid, (meth)acrylamides, hydroxyl functional esters of (meth)acrylic acid, and polyethylene glycol esters of (meth)acrylic acid. In an embodiment, the self-dispersing copolymer is a polyethylene glycol-PCF$_3$ diblock copolymer.

The polymer forms a particle or micelle in water. The amount of water in the particle or micelle can be adjusted to provide the desired level so that the catalyst can be protected to the desired extent, for example. The amount of water in the micelle can be decreased by adding salt, for example.

The Group 8 to Group 11 transition metal containing catalyst and polymer can be present in any desired ratio. The activity of the catalyst can affect the desired ratio of the Group 8 to Group 11 transition metal containing catalyst and polymer. If the activity of the catalyst is higher, the amount of catalyst required is less. In an embodiment, the catalyst and polymer are present in an amount of 0.01 to 0.05 weight catalyst/weight polymer.

The polymer encapsulated catalyst can be formed by dissolving a Group 8 to Group 11 transition metal containing catalyst and a self-dispersing polymer in a solvent; adding water and optionally a base under particle forming conditions to form a polymer encapsulated catalyst. Particle forming conditions are those that are effective to result in the formation of particles. Examples of particle forming conditions are heating and addition of water. Further examples of particle forming conditions are heating up to 70° C. and addition of water over 5 minutes to 5 hours until 50 to 75 volume percent of water is reached. The particle forming conditions are not intended to be limiting, and those of ordinary skill in the art can determine particle forming conditions without undue experimentation. The following provides additional examples of particle forming conditions.

In an embodiment, the Group 8 to Group 11 transition metal containing catalyst and the self-dispersing polymer are placed in a flask, organic solvent is added, and the mixture is stirred. The mixture can be heated to ensure the mixture is fully dissolved and a clear solution is formed. Once the solution is clear, degassed water is added dropwise. This solution is then used for the polymerization. In an embodiment, a portion of the degassed water is added, the organic solvent is removed, and then the remainder of the degassed water is added. In an embodiment, heating is at a temperature up to 70° C. In an embodiment, the water is added over 5 minutes to 5 hours until 50 to 75 volume percent of water is reached. In embodiments, the polymer encapsulated catalyst forms particles having a population number average diameter between 10 and 300 nanometers, as measured by Dynamic Light Scattering.

The dispersed polymer encapsulated catalyst can be used to perform catalytic olefin polymerization. In an embodiment, catalytic olefin polymerization is performed by contacting a dispersed polymer encapsulated catalyst with a monoethylenically unsaturated monomer under polymerization conditions to form a polyolefin. In an embodiment, the monomer is ethylene. In embodiments, monoethylenically unsaturated monomers are ethylene, propylene, 1-butene, 1-pentene, 1-hexene, 1-heptene, 1-octene, and other 2 to 8 carbon atom-containing mono-olefins. In embodiments, more than one different monoethylenically unsaturated monomer can be used in the polymerization, for example, ethylene and propylene, or ethylene and octene. In embodiments, one, two, or three monoethylenically unsaturated monomers can be used to form a polyolefin. The polyolefin can be a homopolymer, copolymer, or terpolymer, for example. In an embodiment, polymerization conditions include applying pressure and agitating, as further described herein.

The methods and catalysts described herein are further illustrated by the following non-limiting examples.

EXAMPLES

The following materials were used.

TABLE 1

| Component | Chemical Description | Source |
|---|---|---|
| Ni Catalyst | Ni catalyst $C_{35}H_{20}F_{12}I_2N_2NiO$ Exact Mass: 1023.88 | |
| 1-NR$_3$ | Pd catalyst $C_{29}H_{40}NO_5PPdS$ Exact Mass: 651.14 | |
| PEG-PCF$_3$ | Polyethyleneglycol-poly(2,2,2-trifluoroethyl methacrylate) diblock copolymer with 100 to 150 PEG repeat units and 22 to 29 PCF$_3$ repeat units | |
| SDS | Sodium dodecyl sulfate | Aldrich |
| THF | Tetrahydrofuran | Fisher Chemical |

Example 1. Pd Catalyst

All reactions were performed under $N_2$ and degassed water was used. 7.6 micromoles of 1-NR$_3$ (Pd catalyst) and 450 milligrams (mg) of PEG-PCF$_3$ (diblock copolymer) were dissolved in 10 milliliters (ml) of THF. The solution was heated to 50° C. for about 5 minutes (min). 20 ml of water was slowly added to the THF solution over the course of about 5 min. The solution was purged with a positive pressure of nitrogen to remove the THF. After 60 min of bubbling the solution should not have any THF smell. This solution was then diluted with deionized water to 100 milliliters final volume and transferred to a pressure reactor. The solution was rapidly heated to 85° C. The reactor was pressurized with 40 bar of ethylene under vigorous stirring. The polymerization was performed for 45 min.

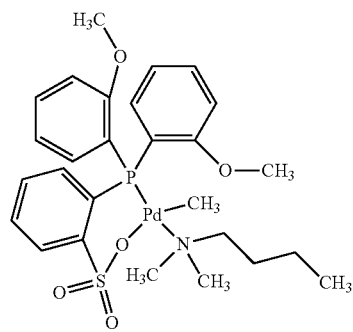

1-NR$_3$

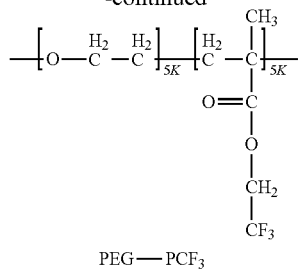

PEG—PCF$_3$

The milkish latex was recovered from the reactor and analyzed by Dynamic Light Scattering (DLS) to confirm the presence of polymeric particles, using the procedure described elsewhere herein. The activity of the catalyst was determined by gravimetry, and the polymer was characterized by IR and NMR spectroscopy. The experiment described above provided a 0.5 wt % solids polyethylene in water latex with a population average particle size of 51 nm, measured using Dynamic Light Scattering and a number average molecular weight of 2100 grams per mole, measured using method high temperature GPC. The total weight of polyethylene recovered was 0.55 grams. The catalyst had an activity of 1800 turn over frequency (TOF) for this reaction, calculated from the mass of polyethylene synthesized and the catalyst loading. A comparative experiment using a miniemulsion resulted in a TOF of 30.

Example 2. Nickel Catalyst

All reactions were performed under $N_2$ and degassed water was used. PEG-PCF$_3$ diblock copolymer and the nickel catalyst shown below were dissolved in THF at 45° C. and 40 mg/ml weight ratios of block copolymer to THF.

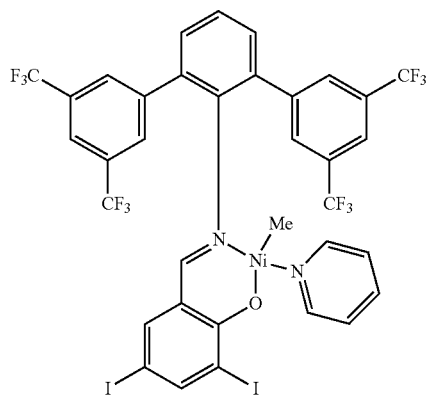

Water was slowly added at 45° C. until about 67 vol. % of water was reached. Samples were heated at 45° C. for about 2 hours (hr) under nitrogen. The samples were diluted with additional water and the reaction run under the same conditions as used in Example 1. The samples were transferred to a polymerization reactor and pressurized with ethylene. DLS and gravimetric analysis of samples before and after polymerization was performed.

Table 2 shows the composition of four samples prepared using the nickel catalyst. Table 3 shows results before and after polymerization, as well as the turn over frequency, calculated from the mass of polyethylene synthesized and the catalyst loading for these samples. The particle size was measured on a Malvern Zetasizer ZS90 particle analyzer using the method of Dynamic Light Scattering.

Although the fundamental size distribution generated by DLS is an intensity distribution, this can be converted, using Mie theory, to a volume distribution or a distribution describing the relative proportion of multiple components in the sample based on their mass or volume rather than based on their scattering (Intensity). When transforming an intensity distribution to a volume/mass distribution, there are 4 assumptions that are accepted: all particles are spherical; all particles are homogeneous; the optical properties of the particles (real and imaginary components of the refractive index) are known; and there is no error in the intensity distribution. An understanding of these assumptions is important since the DLS technique itself produces distributions with inherent peak broadening, so there will always be some error in the representation of the intensity distribution. As such, volume and number distributions derived from these intensity distributions are best used for comparative purposes, or for estimating the relative proportions where there are multiple modes, or peaks, and are not considered absolute. The size of the peak based on an intensity analysis and the relative percentages only (not size) from a volume distribution analysis are typically reported.

TABLE 2

| Sample | Catalyst (micromoles) | Block copolymer (milligrams) | Final volume (milliliter) | Size of particles (nanometer) | Volume distribution (%) |
|---|---|---|---|---|---|
| 1 | 18 | 430 | 100 (5% THF in water) | 26.1 | 98 |
|   |    |     |                      | 303.7 | 2 |
| 2 |    |     |                      | 23.8 | 98 |
|   |    |     |                      | 167.3 | 2 |
| 3 |    |     | 100 (100% water)     | 22.0 | 99 |
|   |    |     |                      | 255.7 | 1 |
| 4 |    |     |                      | 24.5 | 99 |
|   |    |     |                      | 126.7 | 1 |

TABLE 3

| | Particles Before polymerization | | Particles After polymerization | | | Precipitated after polymerization |
|---|---|---|---|---|---|---|
| Sample | Size (nanometer) | Volume distribution (%) | Size (nanometer) | Volume distribution (%) | TOF (h$^{-1}$) | |
| 1 | 26.1 | 98 | 50.9 | 100 | 688 ± 143 | Negligible |
|   | 303.7 | 2 | | | | |
| 2 | 23.8 | 98 | 113.4 | 100 | 901 ± 247 | Negligible |
|   | 167.3 | 2 | | | | |
| 3 | 22.0 | 99 | 66.5 | 100 | 650 ± 262 | No |
|   | 255.7 | 1 | | | | |
| 4 | 24.5 | 99 | 197.5 | 100 | 827 ± 104 | Yes |
|   | 126.7 | 1 | | | | |

*Polymerization Conditions: 40 bar, 90° C., 60 minutes

The results show that for the nickel catalyst (Example 2), the turn over frequency (TOF) is comparable between polymers prepared using the described methods and catalysts prepared using an emulsion polymerization reaction. For the palladium catalyst (Example 1), the activity observed (measured as TOF) is significantly higher than that obtained using traditional emulsion polymerization.

Example 3

Additional experiments were performed using different catalysts and block copolymers, as described below. The catalysts used are shown below. The catalyst $L_1Pd$—$NR_3$ is the structure shown on the left, where $Ar=L_1$, and $X=N(Me)_2 C_6H_{13}$, also referred to as ($NR_3$).

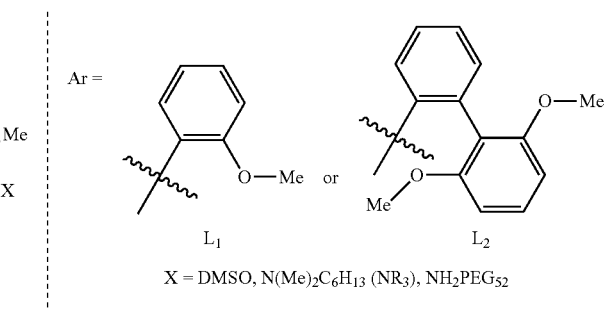

$X = DMSO, N(Me)_2C_6H_{13} (NR_3), NH_2PEG_{52}$

Block copolymer: A series of amphiphilic diblock copolymers were synthesized and used to make spherical micelles in water.

The diblock copolymers were synthesized by reacting a monomethylether PEG-OH polymer (5 kg/mol) into an atom transfer radical polymerization (ATRP) macroinitiator, which was then used to perform the living radical polymerization of different acrylic monomers. In all cases, the molecular weight of the hydrophobic block was targeted to be roughly the same as the molecular weight of the hydrophilic block (about 7000 g mol$^{-1}$) in order to favor the formation of spherical micelles.

Two types of block copolymers were synthesized: PEG-b-PEHA (PEHA; poly(ethyl)hexylacrylate, PEG-b-PCF3 (PCF3; poly(2,2,2-trifluoroethyl methacrylate)) (Scheme 1). These BCPs were successfully synthesized as illustrated by the narrow and monomodal molecular weight distribution measured by GPC (data not shown).

Scheme 1.

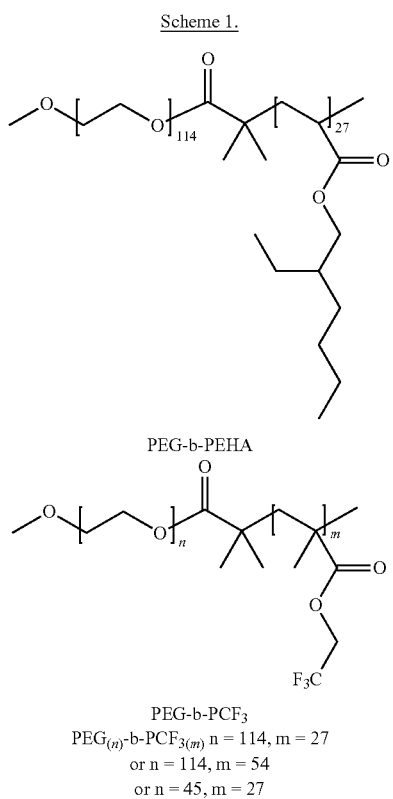

PEG-b-PEHA

PEG-b-PCF₃
PEG$_{(n)}$-b-PCF$_{3(m)}$ n = 114, m = 27
or n = 114, m = 54
or n = 45, m = 27

Micelle formation: In order to encapsulate the hydrophobic catalyst within the micelle, the formation of micelles should be performed via an indirect method in which the catalyst and block copolymer are both dissolved in a water miscible organic solvent (tetrahydrofuran or dimethyl formamide, for example) before the slow addition of water. Upon this addition, the block copolymer collapsed and formed stable micelles. Dynamic light scattering (DLS) measurement was used to determine the size and distribution of the micelles formed. The ability of the block copolymer to form homogeneous micelles reproducibly was tested prior to adding any catalyst. The transparent appearance of the micellar solution provides the first evidence for the formation of homogeneous micelles as a good micellization should result in a clear solution (no light diffraction). From the block copolymers synthesized, PEG$_{(114)}$-b-PEHA$_{(25)}$ and PEG$_{(114)}$-b-PCF$_{3(27)}$ resulted in the formation of transparent micelle solutions. PEG$_{(114)}$-b-PCF$_{3(27)}$ resulted in a uniform and narrow micelle size distribution with an average particle size of 26 nanometers (nm).

The loading of the catalyst into the micelles was achieved by dissolving it in the organic solution containing the block copolymer prior to adding the water. Upon addition of water to L$_1$Pd-DMSO, the solution of L$_1$Pd-DMSO and PEG$_{(114)}$-b-PCF$_{3(27)}$ became turbid, suggesting that the catalyst was not successfully encapsulated in the micelles or that the micelles did not form homogeneously. The replacement of DMSO by a more hydrophobic labile ligand, N,N-dimethylhexylamine (L$_1$Pd—NR$_3$), increased the solubility of the catalysts in THF which resulted in the formation of a clear micellar solution. DLS measurement confirmed the successful encapsulation with the detection of a single population of narrowly dispersed micelles with an average size of 25 nm. Despite the absence of any evidence for agglomerates formation by DLS measurement, the micelle solutions were systematically filtered using a syringe filter with a pore size of 450 nm and only negligible quantities of residue were collected on the filter (mass loss <1%).

Ethylene polymerization in micelles: Micelles made of PEG$_{(114)}$-b-PCF$_{3(27)}$ loaded with L$_1$Pd—NR$_3$ were used to catalyze the polymerization of ethylene in emulsion. In the first experiment, the reactor was loaded with a 100 mL aqueous micelle solution containing 430 mg of PEG$_{(114)}$-b-PCF$_{3(27)}$ and 16 µmol of L$_1$Pd—NR$_3$, pressurized under 40 atm of ethylene and the temperature was set to 85° C. After one hour a milkish solution was collected and no coagulate was observed in the reactor. The formation of polyethylene particles was first confirmed by DLS analysis. The latex was composed of a single population of particles with an average diameter of 84 nm (table 3). The homogenous particle size distribution suggested that the polymerization indeed occurred in the micelles. The activity of the catalyst, determined by gravimetric analysis of the latex solution, was 820 TO h$^{-1}$ (table 3, entry 2). This activity represents a 30-fold improvement in comparison to the miniemulsion polymerization under identical catalyst loading, temperature and time (data not provided).

TEM images of a few samples were obtained and confirmed the size of the particles and their homogeneity measured by DLS (data not shown).

Variation in catalyst and block copolymer loadings (table 4, entries 1-3) showed that catalyst concentration in the micelles correlates directly with the size of the polyethylene particle formed. Higher catalyst concentration achieved either by increase in catalyst loading or by lower block copolymer loading resulted systematically in the formation of larger particles. This is important as it confirms that the polymerization occurs in the micelles. Catalyst and block copolymer loadings had some moderate effect on the catalyst activity. Micelles made of 430 mg of PEG$_{(114)}$-b-PCF$_{3(27)}$ and 16 mol of L$_1$Pd-NR$_3$ were identified to provide the highest activity.

The stability of the catalyst was studied by performing a series of polymerizations for different times. The catalyst showed negligible decomposition within the first 90 minutes of the polymerization as illustrated by a linear increase in TON versus time (data not shown). The 3-hour polymerization showed some decay in activity but this polymerization also resulted in coagulate formation.

TABLE 4

Catalyst (L$_1$Pd-NR$_3$)/BCP (PEG-b-PCF$_3$) ratio variations

| Entry | Catalyst loading [µmol] | BCP PEG-b-PCF$_3$ [mg] | yield PE [g] | TOF$^a$ [h$^{-1}$] | M$_n$ (by NMR) [g mol$^{-1}$] | PSD$^b$ (before) [nm] | PSD$^b$ (after) [nm] |
|---|---|---|---|---|---|---|---|
| 1 | 24 |  | 0.58 | 720 | 6900 | 24 | 117 |
| 2 | 16 | 430 | 0.40 | 820 | 7700 | 26 | 84 |
| 3 | 8 |  | 0.24 | 830 | 4900 | 26 | 57 |
| 4c | 16 | 250 | 0.30 | 610 | 4000 | 26 | 154 |
| 5c |  | 750 | 0.34 | 700 | 7490 | 25 | 68 |

Reaction conditions: catalyst: L$_1$Pd-NR$_3$, 85° C., 40 bar of constant ethylene pressure, 1 h, total volume of solvent: 100 mL;
$^a$mol of ethylene consumed per mol of Pd per hour.
$^b$Average size of micelles or miniemulsion before and after ethylene polymerization determined by light scattering,
$^c$ratio THF/PEG-b-PCF$_3$ maintained constant by varying THF volume Variation in the block copolymer and micelle formation conditions. The use of different additives was studied (Table 5). Interestingly, the use of an ill-defined PEG-b-PCF$_3$ block copolymer with broad molecular weight distribution (but similar PEG/PCF$_3$ ratio) resulted in a polymerization with a 50% improvement in activity (1460 h$^{-1}$, Table 5, entry 1). Some homopolymer (PEG-OH and PCF$_3$) was added to the micelle formation. The use of additional 10 wt % PEG-OH provided a marginal improvement in catalyst activity (920 h$^{-1}$, Table 5, entry 4). The addition of 10 wt % of PCF$_3$ homopolymer resulted in the formation of turbid micelle solution, suggesting that some larger particles formed. These large particles were filtered out prior to the polymerization and 10% enhancement in activity was observed (960 h$^{-1}$, table 5, entry 5).

The block copolymer used for the "ill defined BCP" has the following characteristics:

TABLE 5

| BCP | $M_n{}^a$ | $M_n{}^b$ | (Mw/Mn)$^b$ | Number of repeat units |
|---|---|---|---|---|
| ill defined BCP (PEG$_n$-b-PCF$_3$m) | 10670 | 6460 | 1.4 | n = 104$^c$ m = 37 |

$^a$Determined by NMR analysis using the ratio of methyl ether proton versus the repeating methylene proton of the repeating units,
$^b$GPC analysis (Mn determined versus polystyrene (PS) standard),
$^c$Estimate number of units using the ratio of methyl ether proton versus methyl end group.

DMF was also used in place of THF for the formation of micelles. First, the use of DMF as a solvent did not hamper the encapsulation, as homogeneous micelles with a slightly larger size (31 nm) were formed. The polymerization with these micelles did not result in any significant change in activity versus that measured with the micelles made in THF (870 h$^{-1}$, table 6, entry 2). The use of DMF resulted in lowering of the polymer molecular weight. Following the same procedure, a polymerization performed in D$_2$O did not result in any enhancement in activity (830 h$^{-1}$, table 6, entry 2). Finally the influence of the pH on the micelle system was investigated by decreasing the pH of the micelle solution to about 3 with phosphoric acid. At the lower pH a significant enhancement in activity was unexpectedly observed (1120 h$^{-1}$, table 6, entry 6).

TABLE 6

Variation in reaction conditions

| Entry | Reaction changed | yield PE [g] | TOF$^a$ [h$^{-1}$] | M$_n$ (by NMR) [g mol$^{-1}$] | PSD$^b$ (before) [nm] | PSD$^b$ (after) [nm] |
|---|---|---|---|---|---|---|
| 1 | Micelles formed in THF With PEG-b-PCF$_3$ broad Mn | 0.62 | 1460 | 6600 | 32 | 185 |
| 2 | Micelles formed in DMF With PEG-b-PCF$_3$ pure | 0.36 | 870 | 4630 | 30 | 115 |
| 3 | Micelles formed in THF In D$_2$O | 0.35 | 830 | | 35 | 124 |
| 4 | Micelles formed in THF With PEG-b-PCF$_3$/ PEG-OH (ratio 9:1) | 0.41 | 920 | 8590 | 27 | 86 |
| 5 | Micelles formed in THF With PEG-b-PCF$_3$/PCF$_3$ (ratio 9:1) | 0.43 | 960 | 2900 | 25 | 90 |
| 6 | Micelles formed in THF With PEG-b-PCF$_3$/pH~3$^c$ | 0.52 | 1120 | | 28 | 163 |

Reaction conditions: catalyst: L$_1$Pd-NR$_3$ (16 µmol), PEG-b-PCF$_3$, 85° C., 40 bar of constant ethylene pressure, 1 h, total volume of solvent: 100 mL;
$^a$mol of ethylene consumed per mol of Pd per hour.
$^b$Average size of micelles or miniemulsion before and after ethylene polymerization determined by light scattering.
$^c$pH adjusted with phosphoric acid (10$^{-3}$ mol · L$^{-1}$)

Polymerizations at various ethylene pressures (30, 40 and 50 bar) showed that increasing the pressure results in a linear increase of the activity of the catalyst (FIG. 1).

L$_2$Pd-DMSO: The encapsulation strategy was applied to another palladium phosphinosulfonate catalyst L$_2$Pd-DMSO. This catalyst is of interest because it was shown previously to exhibit very high activity in toluene (774 000 h$^{-1}$). Note that L$_2$Pd-DMSO does not require the use of a fatty alkyl ligand for the formation of homogeneous micelles. The polymerization in micelles with L$_2$Pd-DMSO resulted in activity of up to 2400 TO h$^{-1}$. This activity is lower than the activity of the same catalyst in organic solvent but is twice higher than L$_1$Pd—NR$_3$ under otherwise identical reaction conditions. Some coagulation in the reactor and a broader particle size distribution of the latex was noted. This colloidal instability was attributed to the insufficient stabilization of the PE particle by the block copolymer. The coagulation could be prevented by lowering the catalyst loading (table 7, entry 1) and/or by increasing the BCP loading (table 7, entry 4). The decrease in catalyst loading induced a small decay in activity (1760 h$^{-1}$) while the increase of BCP loading maintained a high TOF of 2130 h$^{-1}$. Even though coagulation during the polymerization could be prevented, the polyethylene particle size distribution of the latex formed with L$_2$Pd-DMSO remained broad. The particle size was narrowed by the addition of 1 equivalent of dimethyl hexyl amine to the organic solution of L$_2$Pd-DMSO and block copolymer to yield an in-situ made L$_2$Pd—NR$_3$. This resulted in catalyst activity of 1830 h$^{-1}$ (table 7, entry 3).

TABLE 7

L$_2$Pd-DMSO catalyzed polymerizations of ethylene

| Entry | Catalyst [µmol] | yield PE [g] | TOF$^a$ [h$^{-1}$] | PSD$^b$ (before) [nm] | PSD$^b$ (after) [nm] |
|---|---|---|---|---|---|
| 1 | 9 | 0.44 | 1760 | 27 | 66 |
| 2 | 16 | 1.1$^d$ | 2430 | 26 | 112 |
| 3$^c$ | 9 | 0.48 | 1830 | 26 | 83 |
| 4$^e$ | 16 | 0.96$^f$ | 2180 | 27 | 103 |

Reaction conditions: 85° C., 40 bar of constant ethylene pressure, 1 h reaction time, total volume of solvent: 100 mL;
$^a$mol of ethylene consumed per mol of Pd per hour.
$^b$Average size of micelles or miniemulsion before and after ethylene polymerization determined by light scattering,
$^c$addition of N(Me)$_2$C$_6$H$_{13}$ (1 equiv.) in THF,
$^d$quantity of PE found dispersed in water an additional 330 mg of coagulated PE was collected by filtration after polymerization
$^e$quantity of BCP and THF used to formed micelle adjusted to same ratio as entry 1 (764 mg PEG-b-PCF$_3$ and 8.8 mL THF),
$^f$quantity of PE found dispersed in water an additional 45 mg of coagulated PE was collected by filtration after polymerization This disclosure is further illustrated by the following Aspects.

Aspect 1: A method for encapsulating a catalyst in a dispersed polymer particle comprising dissolving a Group 8 to Group 11 transition metal containing catalyst and a self-dispersing polymer in a solvent; adding water and optionally a base under particle forming conditions to form a dispersed polymer encapsulated catalyst comprising particles having a population number average diameter between 10 and 300 nanometers.

Aspect 2: The method of Aspect 1, wherein the particle forming conditions are heating and addition of water.

Aspect 3: The method of Aspect 1 or 2, wherein the particle forming conditions are heating up to 70° C. and addition of water over 5 minutes to 5 hours until 50 to 75 volume percent of water is reached.

Aspect 4: The method according to any of Aspects 1-3, wherein the self-dispersing polymer comprises a block copolymer comprising a water-insoluble block having a molecular weight of 500 to 50,000 Daltons, preferably 5,000 to 20,000 Daltons, and a water-soluble block having a molecular weight of 450 to 45,000 Daltons, preferably 450 to 10,000 Daltons, more preferably 1,000 to 5,000 Daltons.

Aspect 5: The method according to any of Aspects 1-4, wherein the water-insoluble block comprises repeat units of esters of (meth)acrylic acid, styrene, butadiene, ethyl ethylene, lactide, caprolactone, trimethylene carbonate, glycolide, dimethylsiloxane, cyclooctene, ethylene, propylene, norbornene, propylene oxide, butylene oxide, or a combination comprising at least one of the foregoing; and the water-soluble block comprises repeat units of ethylene glycol, ethylene oxide, methacrylic acid, acrylic acid, acrylamide, styrene sulfonate, polyethylene glycol esters of (meth)acrylic acid, or a combination comprising at least one of the foregoing.

Aspect 6: The method according to any of Aspects 1-5, wherein the self-dispersing polymer is a polyethylene glycol-PCF$_3$ diblock copolymer.

Aspect 7: The method according to any of Aspects 1-6, wherein the catalyst and polymer are present in an amount of 0.01 to 0.05 weight catalyst/weight polymer.

Aspect 8: The method according to any of Aspects 1-7, wherein the solvent is THF, DMF, DMSO, or methanol.

Aspect 9: The method according to any of Aspects 1-8, wherein the Group 8 to Group 11 transition metal containing catalyst has the formula:

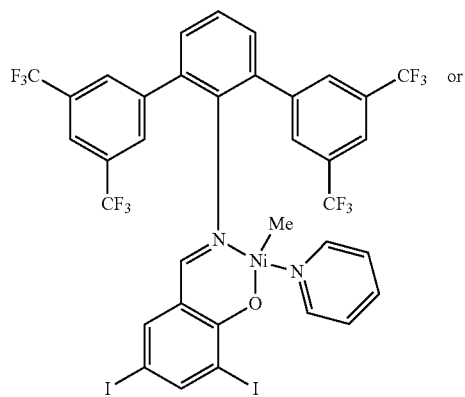

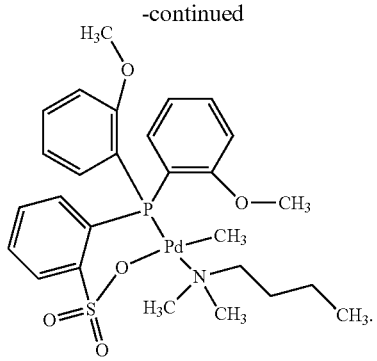

Aspect 10: The method according to any of Aspects 1-9, further comprising adding a salt.

Aspect 11: A method of catalytic olefin polymerization, comprising contacting a dispersed polymer encapsulated catalyst prepared by a method according to any of Aspects 1-10 with one or more monoethylenically unsaturated monomers under polymerization conditions to form a polyolefin.

Aspect 12: The method of Aspect 11, wherein the monoethylenically unsaturated monomers comprise one, two, or three different monoethylenically unsaturated monomers.

Aspect 13: The method of Aspect 11 or 12, wherein a monoethylenically unsaturated monomer is ethylene.

Aspect 14: The method according to any of Aspects 11-12, wherein the monoethylenically unsaturated monomers are ethylene, propylene, octene, or a combination comprising at least one of the foregoing.

Aspect 15: The method according to any of Aspects 11-14, wherein the polyolefin has a number average molecular weight of 1,500 to 200,000 Daltons; 10,000 to 100,000 Daltons; 20,000 to 50,000 Daltons; or 1,500 to 10,000 Daltons.

Aspect 16: The method according to any of Aspects 11-15, wherein the polymerization conditions are applying pressure and agitating.

Aspect 17: The method according to any of Aspects 11-16, wherein the turn over frequency in the catalytic olefin polymerization reaction is 1500 to 5000 per hour.

Aspect 18: A dispersed polymer encapsulated catalyst prepared according to any of Aspects 1-10 comprising a group 8 to 11 transition metal containing catalyst and a self-dispersing block copolymer dispersed in a solvent.

Aspect 19: A latex made by the method of reacting a dispersed polymer encapsulated catalyst prepared according to any of Aspects 1-10 with a monoethylenically unsaturated monomer under polymerization conditions to form a latex having a number average molecular weight of 1,500 to 200,000 Daltons; 10,000 to 100,000 Daltons; 20,000 to 50,000 Daltons; or 1,500 to 10,000 Daltons, wherein the catalyst is a group 8 to 11 transition metal containing catalyst and the polymer is a self-dispersing block copolymer and the polymerization conditions are application of pressure and agitating.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any components, materials, ingredients, adjuvants or species used in the prior art compositions or that are otherwise not necessary to the achievement of the function and/or objectives of the compositions, methods, and articles.

All ranges disclosed herein are inclusive of the endpoints, and the endpoints are independently combinable with each other. "Combination" is inclusive of blends, mixtures, alloys, or reaction products. Furthermore, the terms "first," "second," etc., herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments.

"Alkyl" as used herein refers to hydrocarbyl groups having 1-20 carbon atoms, preferably 2-10 carbon atoms; and "substituted alkyl" includes alkyl groups further having one or more hydroxy, alkoxy (of a lower alkyl group), mercapto (of a lower alkyl group), cycloalkyl, substituted cycloalkyl, heterocyclic, substituted heterocyclic, aryl, substituted aryl, heteroaryl, substituted heteroaryl, aryloxy, substituted aryloxy, halogen, trifluoromethyl, cyano, nitro, nitrone, amino, amido, C(O)H, acyl, oxyacyl, carboxyl, carbamate, sulfonyl, sulfonamide, or sulfuryl substituents. "Lower alkyl" refers to hydrocarbyl radicals having 1-6 carbon atoms, preferably 1-4 carbon atoms; and "substituted lower alkyl" includes lower alkyl groups further having one or more substituents as described herein. "Alkylene" refers to divalent hydrocarbyl groups having 1-20 carbon atoms, preferably 2-10 carbon atoms; and "substituted alkylene" includes alkylene groups further having one or more substituents as set forth above. "Cycloalkylene" refers to divalent cyclic ring-containing groups containing 3-8 carbon atoms, and "substituted cycloalkylene" refers to cycloalkylene groups further having one or more substituents as set forth above. "Arylene" refers to divalent aromatic groups having 6 up to 14 carbon atoms and "substituted arylene" refers to arylene groups further having one or more substituents as set forth above. "Polyarylene" refers to a divalent moiety comprising a plurality (i.e., at least two, up to 10) divalent aromatic groups (each having 6 up to 14 carbon atoms), wherein said divalent aromatic groups are linked to one another directly, or via a 1-3 atom linker; and "substituted polyarylene" refers to polyarylene groups further having one or more substituents as set forth above. "Heteroarylene" refers to divalent aromatic groups containing one or more heteroatoms (e.g., N, O, P, S, or Si) as part of the ring structure, and having 3 up to 14 carbon atoms; and "substituted arylene" refers to arylene groups further having one or more substituents as set forth above. "Polyheteroarylene" refers to a divalent moiety comprising 2-4 heteroarylene groups (each containing at least one heteroatom, and 3-14 carbon atoms), wherein the heteroarylene groups are linked to one another directly, or via a 1-3 atom linker; and "substituted polyheteroarylene" refers to polyheteroarylene groups further having one or more substituents as set forth above. "(Meth)acrylate" refers collectively to acrylate and methacrylate.

All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for encapsulating a catalyst in a dispersed block copolymer particle comprising:
   dissolving a Group 8 to Group 11 transition metal containing catalyst and a self-dispersing block copolymer comprising a water-insoluble block comprising repeat units of esters of (meth)acrylic acid, butadiene, ethyl ethylene, lactide, caprolactone, trimethylene carbonate, glycolide, dimethylsiloxane, cyclooctene, propylene, norbornene, propylene oxide, butylene oxide, or a combination comprising at least one of the foregoing, and a water-soluble block comprising repeat units of ethylene glycol, ethylene oxide, methacrylic acid, acrylic acid, acrylamide, styrene sulfonate, polyethylene glycol esters of (meth)acrylic acid, or a combination comprising at least one of the foregoing, in a water miscible organic solvent; and
   adding water and optionally a base and heating to form a dispersed block copolymer encapsulated catalyst comprising particles having a population number average diameter between 10 and 300 nanometers, measured by dynamic light scattering.

2. The method of claim 1, wherein the heating is at a temperature up to 70° C. and the water is added over 5 minutes to 5 hours until 50 to 75 volume percent of water is reached.

3. The method according to claim 1, wherein the self-dispersing block copolymer is a polyethyleneglycol-poly(2,2,2-trifluoroethyl methacrylate) diblock copolymer.

4. The method according to claim 1, wherein the catalyst and polymer are present in an amount of 0.01 to 0.05 weight catalyst/weight polymer.

5. The method according to claim 1, wherein the water miscible organic solvent is THF, DMF, DMSO, or methanol.

6. The method according to claim 1, wherein the Group 8 to Group 11 transition metal containing catalyst has the formula:

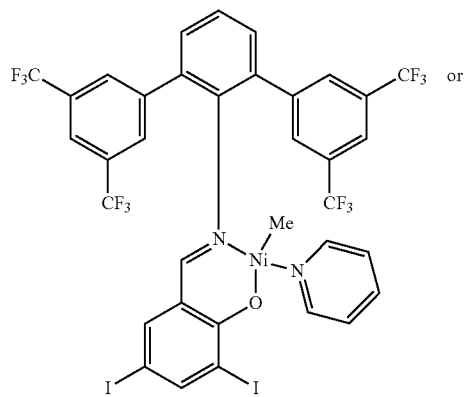 or

-continued

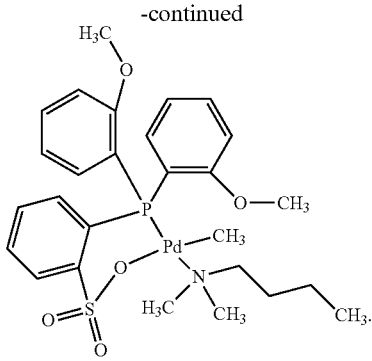

7. The method according to claim 1, further comprising adding a salt.

8. A dispersed block copolymer encapsulated catalyst prepared according to the method of claim 1.

9. A method of catalytic olefin polymerization, comprising contacting a dispersed block copolymer encapsulated catalyst prepared according to the method of claim 1 with one or more monoethylenically unsaturated monomers under polymerization conditions to form a polyolefin.

10. The method of claim 9, wherein the one or more monoethylenically unsaturated monomers comprise one, two, or three different monoethylenically unsaturated monomers.

11. The method of claim 9, wherein the one or more monoethylenically unsaturated monomers is ethylene.

12. The method according to claim 9, wherein the one or more monoethylenically unsaturated monomers are is ethylene, propylene, octene, or a combination comprising at least one of the foregoing.

13. The method according to claim 9, wherein the polymerization conditions are applying pressure and agitating.

14. The method according to claim 9, wherein a turn-over frequency in the catalytic olefin polymerization is 1500 to 5000 per hour.

* * * * *